United States Patent
Han (10) Patent No.: US 12,033,623 B2
(45) Date of Patent: Jul. 9, 2024

(54) SPEECH PROCESSING METHOD AND MOBILE TERMINAL

(71) Applicant: VIVO MOBILE COMMUNICATION CO., LTD., Guangdong (CN)

(72) Inventor: Huizi Han, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 590 days.

(21) Appl. No.: 17/182,983

(22) Filed: Feb. 23, 2021

(65) Prior Publication Data

US 2021/0225376 A1 Jul. 22, 2021

Related U.S. Application Data

(63) Continuation of application No. PCT/CN2019/096087, filed on Jul. 16, 2019.

(30) Foreign Application Priority Data

Aug. 30, 2018 (CN) .......................... 201811001519.6

(51) Int. Cl.
*G10L 15/22* (2006.01)
*G06F 3/04817* (2022.01)
*G06F 3/16* (2006.01)

(52) U.S. Cl.
CPC .......... *G10L 15/22* (2013.01); *G06F 3/04817* (2013.01); *G06F 3/167* (2013.01); *G10L 2015/223* (2013.01)

(58) Field of Classification Search
CPC ................................. G10L 15/22; G06F 3/167
See application file for complete search history.

(56) References Cited

U.S. PATENT DOCUMENTS

| | | |
|---|---|---|
| 2011/0165841 A1 | 7/2011 | Baek et al. |
| 2012/0089392 A1 | 4/2012 | Larco et al. |
| 2013/0179173 A1 | 7/2013 | Lee et al. |
| 2014/0218372 A1 | 8/2014 | Missig et al. |
| 2015/0149354 A1* | 5/2015 | McCoy ................... G06F 3/167 705/42 |
| 2017/0110128 A1 | 4/2017 | Zhang et al. |

(Continued)

FOREIGN PATENT DOCUMENTS

| | | |
|---|---|---|
| CN | 102395013 A | 3/2012 |
| CN | 103208283 A | 7/2013 |

(Continued)

OTHER PUBLICATIONS

Chinese Office Action dated Feb. 12, 2019 as received in application No. 201811001519.6.

(Continued)

*Primary Examiner* — Ibrahim Siddo
(74) *Attorney, Agent, or Firm* — Price Heneveld, LLP (57) ABSTRACT

A speech processing method and a mobile terminal are provided in the present disclosure. The method includes: receiving a speech input; displaying, if an interface displayed by the mobile terminal meets a first preset condition, text content corresponding to the speech input on the interface displayed by the mobile terminal; and controlling, if the interface displayed by the mobile terminal meets a second preset condition, the mobile terminal to execute an instruction corresponding to the speech input.

17 Claims, 6 Drawing Sheets

(56) References Cited

U.S. PATENT DOCUMENTS

| | | | |
|---|---|---|---|
| 2017/0116987 A1 | 4/2017 | Kang et al. | |
| 2017/0344516 A1* | 11/2017 | Hwang | ................ G06F 40/129 |
| 2018/0091643 A1 | 3/2018 | Singh et al. | |
| 2018/0121162 A1 | 5/2018 | Ueno et al. | |

FOREIGN PATENT DOCUMENTS

| | | | |
|---|---|---|---|
| CN | 103246648 | A | 8/2013 |
| CN | 105988581 | A | 10/2016 |
| CN | 107608957 | A | 1/2018 |
| CN | 108364644 | A | 8/2018 |
| CN | 109218526 | A | 1/2019 |
| JP | 2001-092751 | A | 4/2001 |
| JP | 2004234529 | A | 8/2004 |
| JP | 2010-183244 | A | 8/2010 |
| JP | 2013-055700 | A | 3/2013 |
| JP | 2018073067 | A | 5/2018 |
| KR | 20170046958 | A | 5/2017 |
| WO | 2010141802 | A1 | 12/2010 |

OTHER PUBLICATIONS

International Search Report and Written Opinion dated Mar. 11, 2021 as received in application No. PCT/CN2019/096087.
Extended European Search Report dated Oct. 11, 2021 as received in Application No. 19854928.9.
Japanese Office Action dated Apr. 4, 2022 as received in application No. 2021-511616.
JP Office Action dated Nov. 14, 2022 as received in Application No. 2021-511616.
Korean Office Action dated Jul. 23, 2022 as received in application No. 10-2021-7009406.

* cited by examiner

SPEECH PROCESSING METHOD AND MOBILE TERMINAL

CROSS-REFERENCE TO RELATED APPLICATIONS

This application is a continuation application of International Application No. PCT/CN2019/096087 filed on Jul. 16, 2019, which claims priority to Chinese patent Application No. 201811001519.6 filed on Aug. 30, 2018 in China, both disclosures of which are incorporated herein by reference in their entireties.

TECHNICAL FIELD

The present disclosure relates to the field of speech recognition technologies, and in particular, to a speech processing method and a mobile terminal.

BACKGROUND

With continuous development of electronic technologies, a speech recognition technology is increasingly mature, recognition accuracy is higher, and application is more extensive. Currently, speech recognition in a mobile terminal (for example, a smartphone or a tablet computer) mainly includes two modes: a speech input mode and a speech control mode.

In the speech input mode, the mobile terminal converts a received speech into text content, and fills the text content in an input box. The speech input mode is applicable to a scenario in which a user needs to input text content, especially a scenario in which a large amount of text content needs to be input, thereby greatly improving a speed of inputting text content.

In the speech control mode, the mobile terminal recognizes a received speech, and controls, based on recognized content, the mobile terminal to perform a corresponding operation. The speech control mode is applicable to a scenario in which a user cannot conveniently manually operate the mobile terminal, thereby liberating hands of the user and providing convenience for the user.

In the related art, the mobile terminal provides only a fixed key to trigger switching between two different speech recognition modes when a speech recognition function is enabled.

It can be learned that in the related art, the user needs to manually switch a speech mode, which is not convenient enough.

SUMMARY

According to a first aspect, some embodiments of the present disclosure provide a speech processing method, applied to a mobile terminal, where the method includes:
  receiving a speech input;
  displaying, if an interface displayed by the mobile terminal meets a first preset condition, text content corresponding to the speech input on the interface displayed by the mobile terminal; and
  controlling, if the interface displayed by the mobile terminal meets a second preset condition, the mobile terminal to execute an instruction corresponding to the speech input.

According to a second aspect, some embodiments of the present disclosure provide a mobile terminal, and the mobile terminal includes:
  a receiving module, configured to receive a speech input;
  a display module, configured to display, if an interface displayed by the mobile terminal meets a first preset condition, text content corresponding to the speech input on the interface displayed by the mobile terminal; and
  a control module, configured to control, if the interface displayed by the mobile terminal meets a second preset condition, the mobile terminal to execute an instruction corresponding to the speech input.

According to a third aspect, some embodiments of the present disclosure provide another mobile terminal, including a processor, a memory, a computer program that is stored in the memory and that can run on the processor. When the computer program is executed by the processor, steps of the foregoing speech processing method are implemented.

According to a fourth aspect, some embodiments of the present disclosure provide a computer readable storage medium. The computer readable storage medium stores a computer program, and when the computer program is executed by a processor, steps of the foregoing speech processing method are implemented.

BRIEF DESCRIPTION OF DRAWINGS

To describe the technical solutions in some embodiments of the present disclosure more clearly, the following briefly describes the accompanying drawings required for describing some embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in some embodiments of the present disclosure with reference to the accompanying drawings in some embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
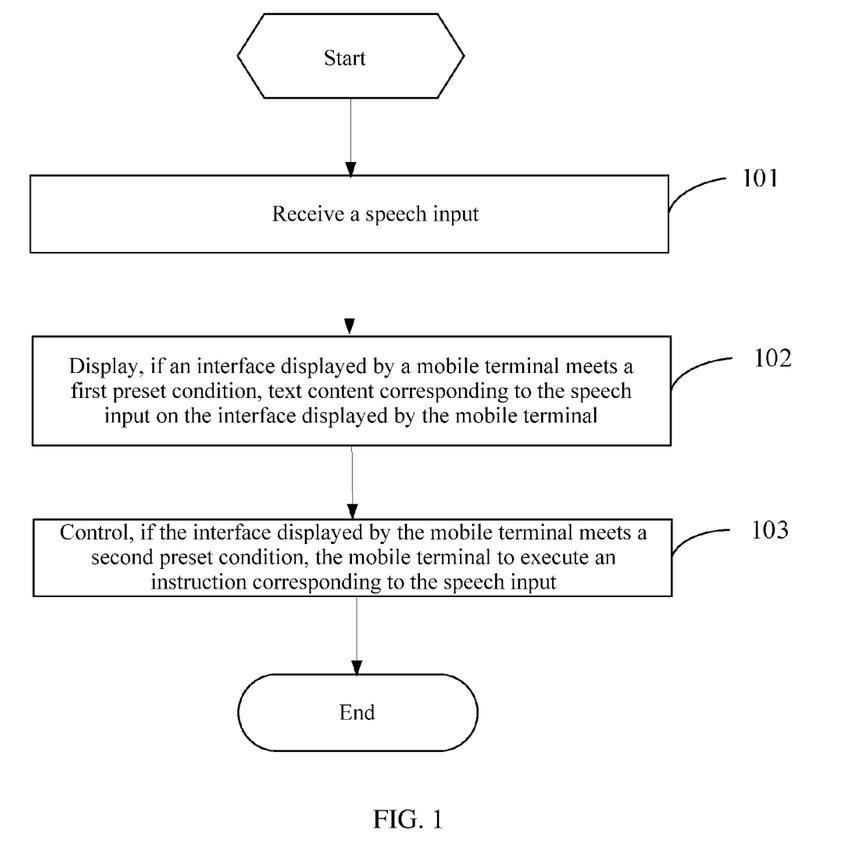
FIG. 1 is a flowchart of a speech processing method according to some embodiments of the present disclosure.

Referring to FIG. 1, FIG. 1 is a flowchart of a speech processing method according to some embodiments of the present disclosure. The speech processing method is applied to a mobile terminal. As shown in FIG. 1, the method includes the following steps.

Step 101: Receive a speech input.

In some embodiments of the present disclosure, when a user needs to use a speech recognition function of the mobile terminal, a speech may be input, and the mobile terminal receives the speech input. Specifically, the mobile terminal receives the speech input when the speech recognition function is enabled. The speech recognition function of the mobile terminal may be triggered and enabled by using a virtual key or a physical key. The speech recognition function of the mobile terminal supports recognition of an input speech and conversion from the input speech into a text to be displayed on an interface of the mobile terminal, and also supports recognition of the input speech and can control, based on the input speech, the mobile terminal to perform a corresponding operation.

Step 102: Display, if an interface displayed by the mobile terminal meets a first preset condition, text content corresponding to the speech input on the interface displayed by the mobile terminal.

Figure 2:
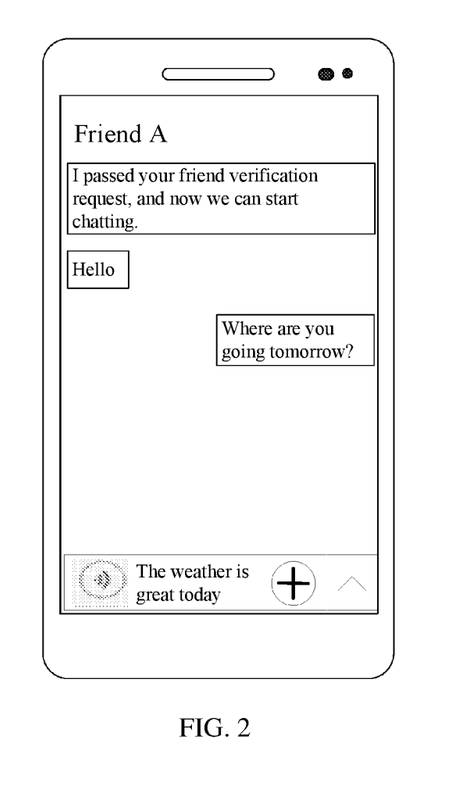
FIG. 2 is a schematic diagram 1 of a user interface according to some embodiments of the present disclosure.
Figure 3:
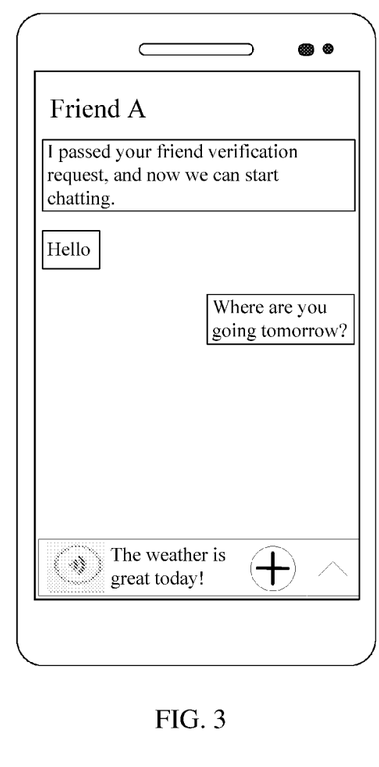
FIG. 3 is a schematic diagram 2 of a user interface according to some embodiments of the present disclosure.

In this step, the mobile terminal determines whether the interface displayed by the mobile terminal meets the first preset condition, and if the interface displayed by the mobile terminal meets the first preset condition, displays the text content corresponding to the speech input on the interface displayed by the mobile terminal. In this way, a speech inputted by the user is converted into text content and the text content is added to an input box. For example, it is assumed that the speech inputted by the user is "The weather is great today". The mobile terminal converts the speech inputted by the user into text content "The weather is great today", to be displayed on the interface displayed by the mobile terminal, as shown in FIG. 2. It can be understood that, in some embodiments of the present disclosure, the mobile terminal may further recognize a tone of the speech inputted by the user, and add a punctuation symbol to the input box based on the text content converted from the speech input, as shown in FIG. 3.

The first preset condition may be that the interface displayed by the mobile terminal includes an input control. Correspondingly, in this case, if the interface displayed by the mobile terminal includes the input control, the text content corresponding to the speech input is displayed in the input control of the interface displayed by the mobile terminal.

The first preset condition may be alternatively that the interface displayed by the mobile terminal includes an input control, and the text content corresponding to the speech input is not target content. Correspondingly, in this case, if the interface displayed by the mobile terminal includes the input control, and the text content corresponding to the speech input is not the target content, the text content corresponding to the speech input is displayed in the input control of the interface displayed by the mobile terminal.

The first preset condition may be alternatively that the interface displayed by the mobile terminal includes an input control, and the mobile terminal does not receive a first input used for moving a target icon to a target area. Correspondingly, in this case, if the interface displayed by the mobile terminal includes the input control, and the first input used for moving the target icon to the target area is not received, the text content corresponding to the speech input is displayed in the input control of the interface displayed by the mobile terminal.

The mobile terminal may determine, based on a component on the interface displayed by the mobile terminal, whether the interface displayed by the mobile terminal includes the input control. Specifically, the mobile terminal may obtain the component on the interface displayed by the mobile terminal, and then determine whether the component on the interface displayed by the mobile terminal includes a target component. If the component on the interface displayed by the mobile terminal includes the target component, the mobile terminal determines that the interface displayed by the mobile terminal includes the input control. On the contrary, if the component on the interface displayed by the mobile terminal does not include the target component, the mobile terminal determines that the interface displayed by the mobile terminal does not include the input control. The target component is a component that can input a text, such as a "textfiled" component.

Step 103: Control, if the interface displayed by the mobile terminal meets a second preset condition, the mobile terminal to execute an instruction corresponding to the speech input.

In this step, the mobile terminal determines whether the interface displayed by the mobile terminal meets the second preset condition, and if the interface displayed by the mobile terminal meets the second preset condition, controls the mobile terminal to execute the instruction corresponding to the speech input. It can be understood that, in some embodiments of the present disclosure, different text content corresponds to different instructions. If the interface displayed by the mobile terminal meets the second preset condition, the mobile terminal converts the speech input into text content, obtains an instruction corresponding to the text content corresponding to the speech input, and then controls the mobile terminal to execute the instruction corresponding to the text content. It should be noted that, in another embodiment of the present disclosure, different speech content corresponds to different instructions. If the interface displayed by the mobile terminal meets the second preset condition, the mobile terminal obtains an instruction corresponding to speech content of the speech input, and then controls the mobile terminal to execute the instruction corresponding to the speech content of the speech input.

The second preset condition may be that the interface displayed by the mobile terminal does not include an input control. Correspondingly, in this case, if the interface displayed by the mobile terminal does not include the input control, it indicates the user has no intention of converting a speech into a text for input, and the mobile terminal is controlled to execute the instruction corresponding to the speech input.

The second preset condition may be alternatively that the interface displayed by the mobile terminal includes an input control, and the text content corresponding to the speech input is target content. Correspondingly, in this case, if the interface displayed by the mobile terminal includes the input control, and the text content corresponding to the speech input is the target content, the mobile terminal is controlled to execute the instruction corresponding to the speech input.

The second preset condition may be alternatively that the interface displayed by the mobile terminal includes an input control, and a first input used for moving a target icon to a target area is received. Correspondingly, in this case, if the interface displayed by the mobile terminal includes the input control, and the first input used for moving the target icon to the target area is received, the mobile terminal is controlled to execute the instruction corresponding to the speech input.

In some embodiments of the present disclosure, the mobile terminal may be an electronic device, for example, a mobile phone, a tablet computer (Tablet Computer), a laptop computer (Laptop Computer), a personal digital assistant (personal digital assistant, PDA for short), a mobile Internet device (Mobile Internet Device, MID for short), a wearable device (Wearable Device), or a digital camera.

In this embodiment, according to the speech processing method, the speech input is received; if the interface displayed by the mobile terminal meets the first preset condition, the text content corresponding to the speech input is displayed on the interface displayed by the mobile terminal; and if the interface displayed by the mobile terminal meets the second preset condition, the mobile terminal is controlled to execute the instruction corresponding to the speech input. In this way, the speech input received by the mobile terminal can be processed according to a condition met by the interface displayed by the mobile terminal, and corresponding processing can be performed on the received speech input without a manual operation of a user, thereby eliminating complexity of manually switching a speech mode by the user and improving convenience.

Optionally, the displaying, if an interface displayed by the mobile terminal meets a first preset condition, text content corresponding to the speech input on the interface displayed by the mobile terminal includes:
  if the interface displayed by the mobile terminal includes an input control, and the text content corresponding to the speech input is not target content, displaying the text content corresponding to the speech input in the input control of the interface displayed by the mobile terminal.

In this embodiment, the first preset condition is that the interface displayed by the mobile terminal includes an input control, and the text content corresponding to the speech input is not target content. If the interface displayed by the mobile terminal includes the input control, the mobile terminal further determines whether the text content corresponding to the speech input is the target content. Specifically, if the text content corresponding to the speech input is not the target content, it is determined that the interface displayed by the mobile terminal meets the first preset condition. On the contrary, if the text content corresponding to the speech input is the target content, it is determined that the interface displayed by the mobile terminal does not meet the first preset condition.

Optionally, the displaying, if an interface displayed by the mobile terminal meets a first preset condition, text content corresponding to the speech input on the interface displayed by the mobile terminal includes:
  if the interface displayed by the mobile terminal includes an input control, and a first input used for moving a target icon to a target area is not received, displaying the text content corresponding to the speech input in the input control of the interface displayed by the mobile terminal, where
  the target icon is an icon displayed on the interface of the mobile terminal when the interface displayed by the mobile terminal includes the input control.

In this embodiment, the first preset condition is that the interface displayed by the mobile terminal includes an input control, and the mobile terminal does not receive a first input used for moving a target icon to a target area.

Figure 4:
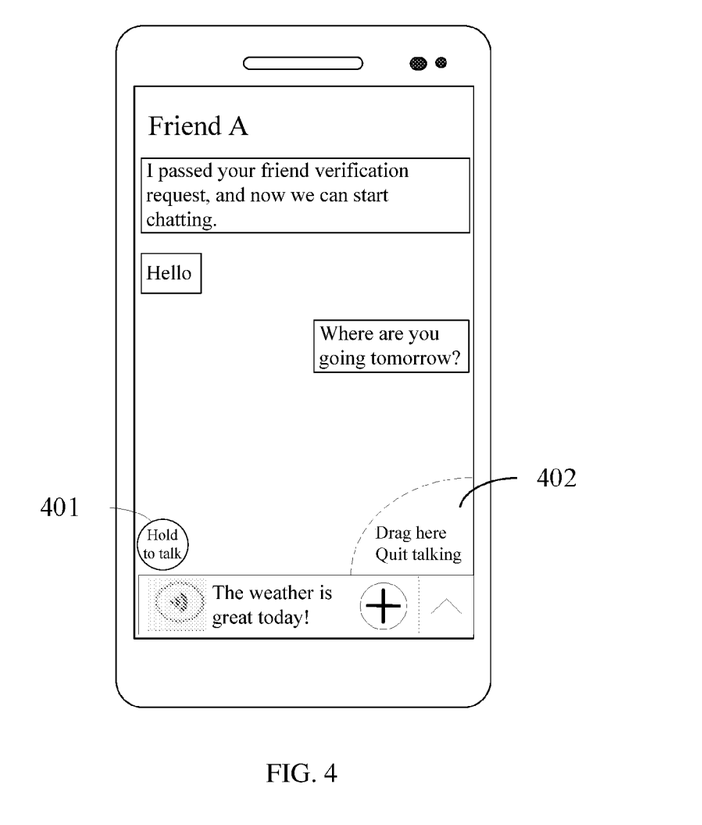
FIG. 4 is a schematic diagram 3 of another user interface according to some embodiments of the present disclosure.

If the interface displayed by the mobile terminal includes the input control, the mobile terminal may display the target icon on the interface of the mobile terminal, for example, an icon 401 shown in FIG. 4. If the user needs to trigger a speech control function, the target icon may be moved to the target area (for example, an area 402 shown in the figure). If the mobile terminal does not receive the first input used for moving the target icon to the target area, the text content corresponding to the speech input is displayed in the input control of the interface displayed by the mobile terminal.

Optionally, the controlling, if the interface displayed by the mobile terminal meets a second preset condition, the mobile terminal to execute an instruction corresponding to the speech input includes:
  if the interface displayed by the mobile terminal does not include an input control, controlling the mobile terminal to execute the instruction corresponding to the speech input.

In this embodiment, the second preset condition includes: the interface displayed by the mobile terminal does not include the input control. It can be understood that, if the interface displayed by the mobile terminal does not include the input control, it indicates the user has no intention of converting a speech into a text for input, and the mobile terminal is controlled to execute the instruction corresponding to the speech input.

Optionally, the controlling, if the interface displayed by the mobile terminal meets a second preset condition, the mobile terminal to execute an instruction corresponding to the speech input includes:
  if the interface displayed by the mobile terminal includes an input control, and the text content corresponding to the speech input is target content, controlling the mobile terminal to execute the instruction corresponding to the speech input.

In this embodiment, the second preset condition includes: the interface displayed by the mobile terminal includes an input control, and the text content corresponding to the speech input is target content. It can be understood that when the interface displayed by the mobile terminal includes the input control, the user may also need to control, by using a speech, the mobile terminal to execute some instructions, for example, after input text through the speech ends, the input text content needs to be sent, or the interface displayed by the mobile terminal needs to be exited or switched. Therefore, the target content may be preset to trigger the mobile terminal to execute the corresponding instruction when the interface displayed on the mobile terminal includes the input control. The mobile terminal determines whether the text content corresponding to the speech input is the target content, and if the text content is not the target content, the mobile terminal displays the text content corresponding to the speech input in the input box. On the contrary, if the text content is the target content, the mobile terminal is controlled to execute the instruction corresponding to the text content corresponding to the speech input.

In this embodiment, different target content corresponds to different instructions. If the text content corresponding to the speech input is first target content, the mobile terminal is controlled to execute an instruction corresponding to the first target content. If the text content corresponding to the speech input is second target content, the mobile terminal is controlled to execute an instruction corresponding to the second target content. Specifically, if the text content corresponding to the speech input is the first target content (for example, "Send"), the mobile terminal is controlled to send content in the input control. If the text content is the second target content (for example, "Exit" or "Switch"), the interface displayed by the mobile terminal is exited or switched.

It should be noted that when the text content corresponding to the speech input is the first target content, the mobile terminal may first determine whether the content in the input control is empty, and the mobile terminal sends the content in the input control only when the content in the input control is not empty.

Optionally, the controlling, if the interface displayed by the mobile terminal meets a second preset condition, the mobile terminal to execute an instruction corresponding to the speech input includes:

if the interface displayed by the mobile terminal includes an input control, and a first input used for moving a target icon to a target area, controlling the mobile terminal to execute the instruction corresponding to the speech input, where the target icon is an icon displayed on the interface of the mobile terminal when the interface displayed by the mobile terminal includes the input control.

In this embodiment, the second preset condition is that the interface displayed by the mobile terminal does not include an input control, or the second preset condition is that the interface displayed by the mobile terminal includes an input control, and the mobile terminal receives a first input used for moving a target icon to a target area.

If the interface displayed by the mobile terminal includes the input control, the mobile terminal may display the target icon on the interface of the mobile terminal, for example, an icon 401 shown in FIG. 4. If the user needs to trigger a speech control function, the target icon may be moved to the target area (for example, an area 402 shown in the figure). If the mobile terminal receives the first input used for moving the target icon to the target area, it is determined that the interface displayed by the mobile terminal meets the second preset condition, and the mobile terminal is controlled to execute the instruction corresponding to the speech input It can be understood that the target icon is an icon corresponding to the speech input function. The mobile terminal may display the icon 401 shown in FIG. 4 on the interface of the mobile terminal, and "Dictation" is marked on the icon, so that the user can understand a current speech mode of the mobile terminal, or "Dictation" may not be marked on the icon. The target area may be any preset area, and the mobile terminal may mark, in the target area, text content "Drag here to exit the dictation" shown in FIG. 4, so that the user can understand a location of the target area or the user can learn how to exit the speech input mode of the mobile terminal, or may not mark any content in the target area. The icon 401 and the target area 402 shown in FIG. 4 are merely an example for description, and are not limited thereto.

Figure 5:
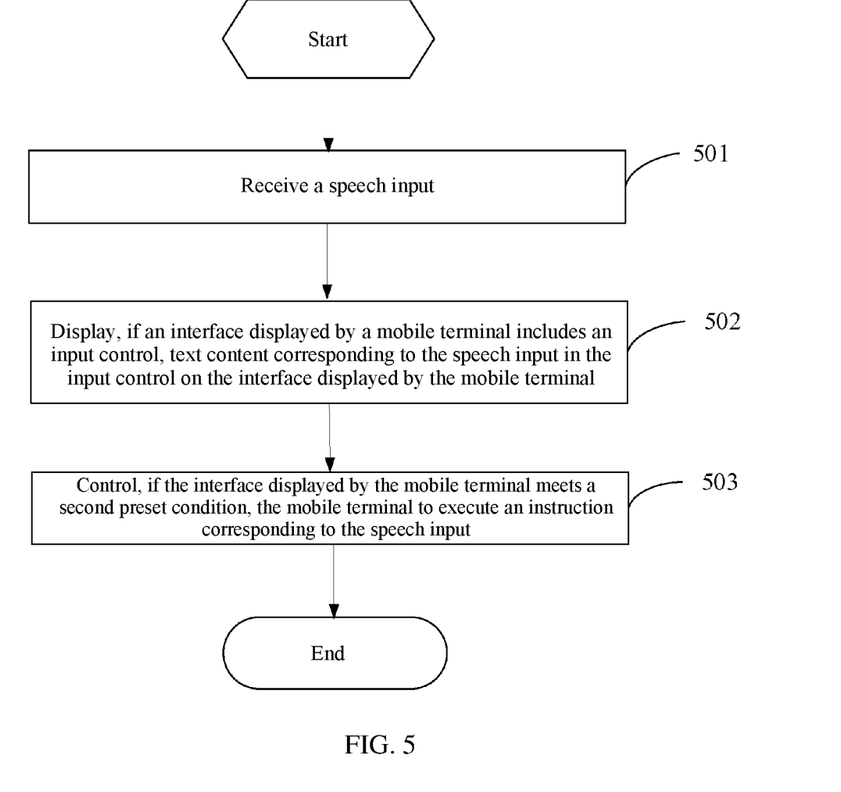
FIG. 5 is a flowchart of a speech processing method according to some embodiments of the present disclosure.

Referring to FIG. 5, FIG. 5 is a flowchart of another speech processing method according to some embodiments of the present disclosure. The method is applied to a mobile terminal. As shown in FIG. 5, the method includes the following steps.

Step 501: Receive a speech input.

Step 501 is the same as step 101 in the embodiment shown in FIG. 1 of the present disclosure, and details are not described herein again.

Step 502: Display, if an interface displayed by the mobile terminal includes an input control, text content corresponding to the speech input in the input control of the interface displayed by the mobile terminal.

If the interface displayed by the mobile terminal includes the input control, it indicates that a user may expect to convert a speech into a text and input the text into the input control, and display the text content corresponding to the speech input in the input control of the interface displayed by the mobile terminal.

Step 503: Control, if the interface displayed by the mobile terminal meets a second preset condition, the mobile terminal to execute an instruction corresponding to the speech input Step 503 is the same as step 103 in the embodiment shown in FIG. 1 of the present disclosure, and details are not described herein again.

In this embodiment, according to the speech processing method, the speech input is received; if the interface displayed by the mobile terminal includes the input control, the text content corresponding to the speech input is displayed in the input control of the interface displayed by the mobile terminal; and if the interface displayed by the mobile terminal meets the second preset condition, the mobile terminal is controlled to execute the instruction corresponding to the speech input. In this way, the speech input received by the mobile terminal can be processed according to whether the interface displayed by the mobile terminal includes the input control, and corresponding processing can be performed on the received speech input without a manual operation of a user, thereby eliminating complexity of manually switching a speech mode by the user and improving convenience.

Figure 6:
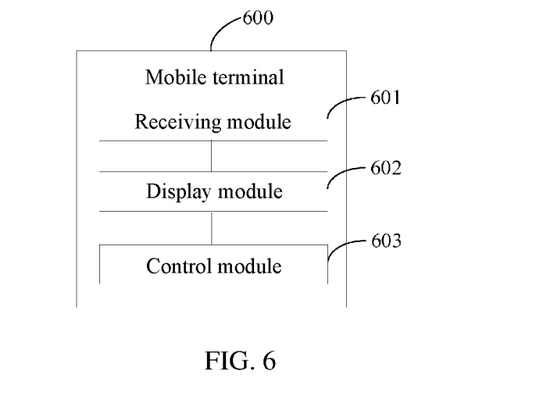
FIG. 6 is a structural diagram of a mobile terminal according to some embodiments of the present disclosure.

Referring to FIG. 6, FIG. 6 is a structural diagram of a mobile terminal according to some embodiments of the present disclosure. As shown in FIG. 6, a mobile terminal 600 includes:

a receiving module 601, configured to receive a speech input;

a display module 602, configured to display, if an interface displayed by the mobile terminal meets a first preset condition, text content corresponding to the speech input on the interface displayed by the mobile terminal; and a control module 603, configured to control, if the interface displayed by the mobile terminal meets a second preset condition, the mobile terminal to execute an instruction corresponding to the speech input.

Optionally, the display module 602 is specifically configured to:

if the interface displayed by the mobile terminal includes an input control, display the text content corresponding to the speech input in the input control of the interface displayed by the mobile terminal.

Optionally, the display module 602 is specifically configured to:

if the interface displayed by the mobile terminal includes an input control, and the text content corresponding to the speech input is not target content, display the text content corresponding to the speech input in the input control of the interface displayed by the mobile terminal.

Optionally, the display module 602 is specifically configured to:

if the interface displayed by the mobile terminal includes an input control, and a first input used for moving a target icon to a target area is not received, display the text content corresponding to the speech input in the input control of the interface displayed by the mobile terminal, where the target icon is an icon displayed on the interface of the mobile terminal when the interface displayed by the mobile terminal includes the input control.

Optionally, the control module 603 is specifically configured to:

if the interface displayed by the mobile terminal does not include an input control, control the mobile terminal to execute the instruction corresponding to the speech input.

Optionally, the control module 603 is specifically configured to:

if the interface displayed by the mobile terminal includes an input control, and the text content corresponding to the speech input is target content, control the mobile terminal to execute the instruction corresponding to the speech input.

Optionally, the control module 603 is specifically configured to:

if the interface displayed by the mobile terminal includes an input control, and a first input used for moving a target icon to a target area, control the mobile terminal to execute the instruction corresponding to the speech input, where the target icon is an icon displayed on the interface of the mobile terminal when the interface displayed by the mobile terminal includes the input control.

In this embodiment, the mobile terminal receives the speech input; if the interface displayed by the mobile terminal meets the first preset condition, displays the text content corresponding to the speech input on the interface displayed by the mobile terminal; and If the interface displayed by the mobile terminal meets the second preset condition, controls the mobile terminal to execute the instruction corresponding to the speech input. In this way, the mobile terminal can process, according to a condition met by the interface displayed by the mobile terminal, the speech input received by the mobile terminal, and can perform corresponding processing on the received speech input without a manual operation of a user, thereby eliminating complexity of manually switching a speech mode by the user and improving convenience.

Figure 7:
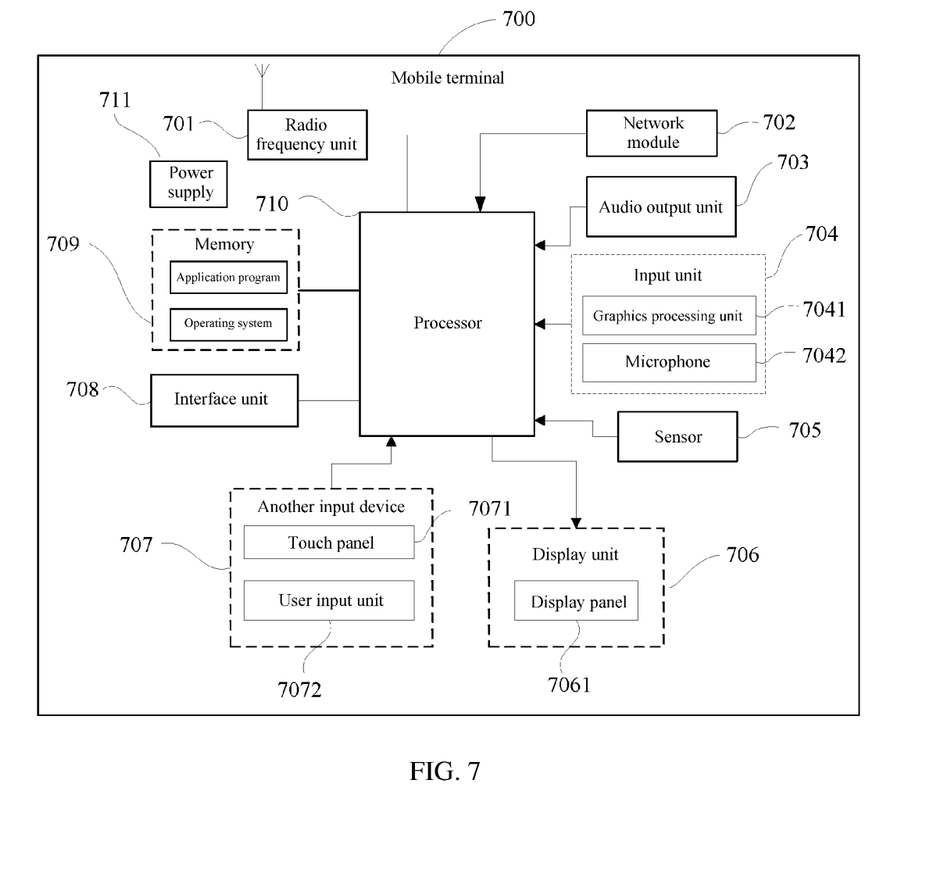
FIG. 7 is a schematic diagram of a hardware structure of a mobile terminal according to some embodiments of the present disclosure.

FIG. 7 is a schematic diagram of a hardware structure of a mobile terminal according to the embodiments of the present disclosure. As shown in FIG. 7, a mobile terminal 700 includes but is not limited to components such as a radio frequency unit 701, a network module 702, an audio output unit 703, an input unit 704, a sensor 705, a display unit 706, a user input unit 707, an interface unit 708, a memory 709, a processor 710, and a power supply 711. A person skilled in the art may understand that the structure of the mobile terminal shown in FIG. 7 constitutes no limitation on the mobile terminal, and the mobile terminal may include more or fewer parts than those shown in the figure, or combine some parts, or have a different part arrangement. In some embodiments of the present disclosure, the mobile terminal includes but is not limited to a mobile phone, a tablet computer, a laptop computer, a palmtop computer, an in-vehicle mobile terminal, a wearable device, a pedometer, and the like.

The processor 710 is configured to:
receive a speech input;
display, if an interface displayed by the mobile terminal meets a first preset condition, text content corresponding to the speech input on the interface displayed by the mobile terminal; and
control, if the interface displayed by the mobile terminal meets a second preset condition, the mobile terminal to execute an instruction corresponding to the speech input.

Optionally, the displaying, by the processor 710 if an interface displayed by the mobile terminal meets a first preset condition, text content corresponding to the speech input on the interface displayed by the mobile terminal includes:

if the interface displayed by the mobile terminal includes an input control, displaying the text content corresponding to the speech input in the input control of the interface displayed by the mobile terminal.

Optionally, the displaying, by the processor 710 if an interface displayed by the mobile terminal meets a first preset condition, text content corresponding to the speech input on the interface displayed by the mobile terminal includes:

if the interface displayed by the mobile terminal includes an input control, and the text content corresponding to the speech input is not target content, displaying the text content corresponding to the speech input in the input control of the interface displayed by the mobile terminal.

Optionally, the displaying, by the processor 710 if an interface displayed by the mobile terminal meets a first preset condition, text content corresponding to the speech input on the interface displayed by the mobile terminal includes:

if the interface displayed by the mobile terminal includes an input control, and a first input used for moving a target icon to a target area is not received, displaying the text content corresponding to the speech input in the input control of the interface displayed by the mobile terminal, where the target icon is an icon displayed on the interface of the mobile terminal when the interface displayed by the mobile terminal includes the input control.

Optionally, the controlling, by the processor 710 if the interface displayed by the mobile terminal meets a second preset condition, the mobile terminal to execute an instruction corresponding to the speech input includes:

if the interface displayed by the mobile terminal does not include an input control, controlling the mobile terminal to execute the instruction corresponding to the speech input.

Optionally, the controlling, by the processor 710 if the interface displayed by the mobile terminal meets a second preset condition, the mobile terminal to execute an instruction corresponding to the speech input includes:

if the interface displayed by the mobile terminal includes an input control, and the text content corresponding to the speech input is target content, controlling the mobile terminal to execute the instruction corresponding to the speech input.

Optionally, the controlling, by the processor 710 if the interface displayed by the mobile terminal meets a second preset condition, the mobile terminal to execute an instruction corresponding to the speech input includes:

if the interface displayed by the mobile terminal includes an input control, and a first input used for moving a target icon to a target area, controlling the mobile terminal to execute the instruction corresponding to the speech input, where the target icon is an icon displayed on the interface of the mobile terminal when the interface displayed by the mobile terminal includes the input control.

In some embodiments of the present disclosure, the mobile terminal receives the speech input; if the interface displayed by the mobile terminal meets the first preset condition, displays the text content corresponding to the speech input on the interface displayed by the mobile terminal; and if the interface displayed by the mobile terminal meets the second preset condition, controls the mobile terminal to execute the instruction corresponding to the speech input. In this way, the mobile terminal can process, according to a condition met by the interface displayed by the mobile terminal, the speech input received by the mobile terminal, and can perform corresponding processing on the received speech input without a manual operation of a user, thereby eliminating complexity of manually switching a speech mode by the user and improving convenience.

It should be understood that, in some embodiments of the present disclosure, the radio frequency unit 701 may be configured to receive and send information or receive and send a signal in a call process. Specifically, after receiving downlink data from a base station, the radio frequency unit sends the downlink data to the processor 710 for processing. In addition, the radio frequency unit sends uplink data to the base station. Usually, the radio frequency unit 701 includes but is not limited to an antenna, at least one amplifier, a transceiver, a coupler, a low noise amplifier, a duplexer, and the like. In addition, the radio frequency unit 701 may communicate with a network and another device through a wireless communication system.

The mobile terminal provides wireless broadband Internet access for a user by using the network module 702, for example, helping the user send and receive an email, browse a web page, and access streaming media.

The audio output unit 703 may convert audio data received by the radio frequency unit 701 or the network module 702 or stored in the memory 709 into an audio signal and output the audio signal as sound. In addition, the audio output unit 703 may further provide audio output (for example, a call signal received voice, or a message received voice) related to a specific function executed by the mobile terminal 700. The audio output unit 703 includes a speaker, a buzzer, a telephone receiver, and the like.

The input unit 704 is configured to receive an audio signal or a video signal. The input unit 704 can include a GPU (Graphics Processing Unit) 7041 and a microphone 7042. The GPU 7041 processes image data of static pictures or videos acquired by an image capturing device (for example a camera) in a video capturing mode or an image capturing mode. The processed image frames can be displayed on the display unit 706. The image frame processed by the graphics processing unit 7041 may be stored in the memory 709 (or another storage medium) or sent by using the radio frequency unit 701 or the network module 702. The microphone 7042 may receive a sound and can process such sound into audio data. The processed audio data may be converted, in a call mode, into a format that can be sent by using the radio frequency unit 701 to a mobile communication base station, and the format is output.

The mobile terminal 700 further includes at least one sensor 705 such as an optical sensor, a motion sensor, or another sensor. Specifically, the optional sensor includes an ambient light sensor and a proximity sensor. The ambient light sensor may adjust luminance of the display panel 7061 based on brightness of ambient light, and the proximity sensor may disable the display panel 7061 and/or backlight when the mobile terminal 700 approaches an ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 705 may further include a fingerprint sensor, a pressure sensor, an iris sensor, a molecular sensor, a gyroscope, a barometer, a hygrometer, a thermometer, an infrared sensor, and the like. Details are not described herein.

The display unit 706 is configured to display information entered by a user or information provided for a user. The display unit 706 may include the display panel 7061. The display panel 7061 may be configured in a form of a liquid crystal display (Liquid Crystal Display, LCD), an organic light-emitting diode (Organic Light-Emitting Diode, OLED), or the like.

The user input unit 707 may be configured to: receive digit or character information that is input, and generate key signal input related to user setting and function control of the mobile terminal. Specifically, the user input unit 707 includes a touch panel 7071 and another input device 7072. The touch panel 7071 is also referred to as a touchscreen, and may collect a touch operation performed by a user on or near the touch panel 7071 (such as an operation performed by a user on the touch panel 7071 or near the touch panel 7071 by using any proper object or accessory, such as a finger or a stylus). The touch panel 7071 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 710, and receives and executes a command from the processor 710. In addition, the touch panel 7071 may be implemented by using a plurality of types such as a resistive type, a capacitive type, an infrared ray, and a surface acoustic wave. The user input unit 707 may include the another input device 7072 in addition to the touch panel 7071. Specifically, the another input device 7072 may include but is not limited to one or more of a physical keyboard, a function key (such as a volume control key or an on/off key), a trackball, a mouse, a joystick, and the like. Details are not described herein again.

Further, the touch panel 7071 may cover the display panel 7061. After detecting the touch operation on or near the touch panel 7071, the touch panel 7071 transmits the touch operation to the processor 710 to determine a type of a touch event, and then the processor 710 provides corresponding visual output on the display panel 7061 based on the type of the touch event. In FIG. 7, although the touch panel 7071 and the display panel 7061 are used as two independent parts to implement input and output functions of the mobile terminal, in some embodiments, the touch panel 7071 and the display panel 7061 may be integrated to implement the input and output functions of the mobile terminal. Details are not described herein.

The interface unit 708 is an interface connecting an external apparatus to the mobile terminal 700. For example, the external apparatus may include a wired or wireless headphone port, an external power supply (or a battery charger) port, a wired or wireless data port, a storage card port, a port used to connect to an apparatus having an identification module, an audio input/output (I/O) port, a video I/O port, and a headset port. The interface unit 708 may be configured to receive input (for example, data information or power) from the external apparatus and transmit the received input to one or more elements in the mobile terminal 700 or may be configured to transmit data between the mobile terminal 700 and the external apparatus.

The memory 709 may be configured to store a software program and various data. The memory 709 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 709 may include a high-speed random access memory, and may further include a non-volatile memory such as at least one magnetic disk storage component, a flash memory component, or another volatile solid-state storage component.

The processor 710 is a control center of the mobile terminal and is connected to all the parts of the entire mobile terminal by using various interfaces and lines, and performs various functions of the mobile terminal and data processing by running or executing the software program and/or module that are/is stored in the memory 709 and by invoking data stored in the memory 709, so as to perform overall monitoring on the mobile terminal. The processor 710 may include one or more processing units. Optionally, the processor 710 may be integrated with an application processor and a modem processor. The application processor mainly processes an operating system, a user interface, an application program, and the like, and the modem processor mainly processes wireless communication. It may be understood that the modem processor may not be integrated into the processor 710.

The mobile terminal 700 may further include a power supply 711 (such as a battery) that supplies power to each component. Optionally, the power supply 711 may be logically connected to the processor 710 by using a power supply management system, to implement functions such as charging, discharging, and power consumption management by using the power supply management system.

In addition, the mobile terminal 700 includes some functional modules not shown, and details are not described herein again.

Optionally, some embodiments of the present disclosure further provide a mobile terminal, including a processor 710, a memory 709, and a computer program that is stored in the memory 709 and that may run on the processor 710. When the computer program is executed by the processor 710, processes of the foregoing speech processing method embodiment are implemented, and a same technical effect can be achieved. To avoid repetition, details are not described herein again.

Some embodiments of the present disclosure further provide a computer readable storage medium. The computer readable storage medium stores a computer program. When the computer program is executed by a processor, processes of the foregoing speech processing method embodiment are implemented, and a same technical effect can be achieved. To avoid repetition, details are not described herein again. The computer readable storage medium includes a Read-Only Memory (Read-Only Memory, ROM for short), a Random Access Memory (Random Access Memory, RAM for short), a magnetic disk, an optical disc, or the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . ." does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the related art may be implemented in a form of a software product. The computer software product is stored in a storage medium (for example, a ROM/RAM, a floppy disk, or an optical disc), and includes several instructions for instructing a mobile terminal (which may be a mobile phone, a server, an air conditioner, a network device, or the like) to perform the methods described in the embodiments of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A speech processing method, applied to a mobile terminal, wherein the method comprises:
    displaying an interface in response to triggering and enabling a speech recognition function of the mobile terminal;
    receiving a speech input;
    determining, based on whether the interface comprises an input control, that the interface meets a first preset condition or a second preset condition;
    displaying, if the interface meets the first preset condition, text content corresponding to the speech input on the interface; and
    controlling, if the interface meets the second preset condition, the mobile terminal to execute an instruction corresponding to the speech input;
    wherein the controlling, if the interface meets a second preset condition, the mobile terminal to execute an instruction corresponding to the speech input comprises:
    displaying a target icon on the interface when the interface comprises the input control;
    if the interface comprises the input control, and a first input used for moving the target icon from a position where the target icon is located to a target area of the interface is received, controlling the mobile terminal to execute the instruction corresponding to the speech input.

2. The speech processing method according to claim 1, wherein the displaying, if the interface meets a first preset condition, text content corresponding to the speech input on the interface comprises:
    if the interface comprises the input control, displaying the text content corresponding to the speech input in the input control of the interface.

3. The speech processing method according to claim 1, wherein the displaying, if the interface meets the first preset condition, text content corresponding to the speech input on the interface comprises:
 if the interface comprises the input control, and the text content corresponding to the speech input is not target content, displaying the text content corresponding to the speech input in the input control of the interface.

4. The speech processing method according to claim 1, wherein the displaying, if the interface meets the first preset condition, text content corresponding to the speech input on the interface comprises:
 if the interface comprises the input control, and a first input used for moving a target icon to a target area is not received, displaying the text content corresponding to the speech input in the input control of the interface, wherein
 the target icon is an icon displayed on the interface of the mobile terminal when the interface comprises the input control.

5. The speech processing method according to claim 1, wherein the controlling, if the interface meets the second preset condition, the mobile terminal to execute an instruction corresponding to the speech input comprises:
 if the interface does not comprise the input control, controlling the mobile terminal to execute the instruction corresponding to the speech input.

6. The speech processing method according to claim 1, wherein the controlling, if the interface meets the second preset condition, the mobile terminal to execute an instruction corresponding to the speech input comprises:
 if the interface comprises the input control, and the text content corresponding to the speech input is target content, controlling the mobile terminal to execute the instruction corresponding to the speech input.

7. A mobile terminal, comprising a processor, a memory, and a computer program that is stored in the memory and that can run on the processor, wherein the computer program is executed by the processor to implement:
 displaying an interface in response to triggering and enabling a speech recognition function of the mobile terminal;
 receiving a speech input;
 determining, based on whether the interface comprises an input control, that the interface meets a first preset condition or a second preset condition;
 displaying, if the interface meets the first preset condition, text content corresponding to the speech input on the interface; and
 controlling, if the interface meets the second preset condition, the mobile terminal to execute an instruction corresponding to the speech input;
 wherein the controlling, if the interface meets a second preset condition, the mobile terminal to execute an instruction corresponding to the speech input comprises:
 displaying a target icon on the interface when the interface comprises the input control;
 if the interface comprises the input control, and a first input used for moving the target icon from a position where the target icon is located to a target area of the interface is received, controlling the mobile terminal to execute the instruction corresponding to the speech input.

8. The mobile terminal according to claim 7, wherein the computer program is further executed by the processor to implement:
 if the interface comprises the input control, displaying the text content corresponding to the speech input in the input control of the interface.

9. The mobile terminal according to claim 7, wherein the computer program is further executed by the processor to implement:
 if the interface comprises the input control, and the text content corresponding to the speech input is not target content, displaying the text content corresponding to the speech input in the input control of the interface.

10. The mobile terminal according to claim 7, wherein the computer program is further executed by the processor to implement:
 if the interface comprises the input control, and a first input used for moving a target icon to a target area is not received, displaying the text content corresponding to the speech input in the input control of the interface, wherein
 the target icon is an icon displayed on the interface of the mobile terminal when the interface comprises the input control.

11. The mobile terminal according to claim 7, wherein the computer program is further executed by the processor to implement:
 if the interface does not comprise the input control, controlling the mobile terminal to execute the instruction corresponding to the speech input.

12. The mobile terminal according to claim 7, wherein the computer program is further executed by the processor to implement:
 if the interface comprises the input control, and the text content corresponding to the speech input is target content, controlling the mobile terminal to execute the instruction corresponding to the speech input.

13. A non-transitory computer readable storage medium storing a computer program, wherein the computer program is executed by a processor to implement:
 displaying an interface in response to triggering and enabling a speech recognition function of the mobile terminal;
 receiving a speech input;
 determining, based on whether the interface comprises an input control, that the interface meets a first preset condition or a second preset condition;
 displaying, if the interface meets the first preset condition, text content corresponding to the speech input on the interface; and
 controlling, if the interface meets the second preset condition, the mobile terminal to execute an instruction corresponding to the speech input;
 wherein the controlling, if the interface meets a second preset condition, the mobile terminal to execute an instruction corresponding to the speech input comprises:
 displaying a target icon on the interface when the interface comprises the input control;
 if the interface comprises the input control, and a first input used for moving the target icon from a position where the target icon is located to a target area of the interface is received, controlling the mobile terminal to execute the instruction corresponding to the speech input.

14. The non-transitory computer readable storage medium according to claim 13, wherein the computer program is further executed by the processor to implement:
 if the interface comprises the input control, and the text content corresponding to the speech input is not target content, displaying the text content corresponding to the speech input in the input control of the interface.

15. The non-transitory computer readable storage medium according to claim 13, wherein the computer program is further executed by the processor to implement:
if the interface comprises the input control, and a first input used for moving a target icon to a target area is not received, displaying the text content corresponding to the speech input in the input control of the interface, wherein
the target icon is an icon displayed on the interface of the mobile terminal when the interface comprises the input control.

16. The non-transitory computer readable storage medium according to claim 13, wherein the computer program is further executed by the processor to implement:
if the interface does not comprise the input control, controlling the mobile terminal to execute the instruction corresponding to the speech input.

17. The non-transitory computer readable storage medium according to claim 13, wherein the computer program is further executed by the processor to implement:
if the interface comprises the input control, and the text content corresponding to the speech input is target content, controlling the mobile terminal to execute the instruction corresponding to the speech input.

* * * * *